INVENTORS
KAY DEWAIN ESS
DONALD JAMES RYAN

BY Edwin Tocker

ATTORNEY

United States Patent Office 3,512,570
Patented May 19, 1970

3,512,570
METHOD FOR THERMO-MECHANICALLY BREAKING POLMER DISPERSION FOAM AND SEPARATING THE RESULTING LIQUID-VAPOR DISPERSION PHASES
Kay Dewain Ess, Bridge City, and Donald James Ryan, Orange, Tex., assignors to E. I. du Pont de Nemours and Company, Wilmington, Delaware, a corporation of Delaware
Filed June 15, 1967, Ser. No. 646,309
Int. Cl. B01d 1/14
U.S. Cl. 159—48          6 Claims

ABSTRACT OF THE DISCLOSURE

A solids-bearing liquid phase can be concentrated and recovered from a solids-containing liquid gas foam and a jet of super-heated steam through the constricted portion of a Venturi-type tube and allowing the velocity of the steam and foam mixture to be slowed from above 100 ft./sec. in the constricted portion of the tube to less than 75 ft./sec. in the larger portion of the tube. The velocity let-down breaks the foam and the super-heated steam vaporizes liquid from the liquid dispersion phase which results in concentration of the liquid phase.

---

When making polymer dispersions it has been found that prior to use it is desirable to concentrate the dispersion made in early synthesis steps by removing a portion of the liquid in which the polymer is dispersed. The method usually employed to concentrate the dispersion is to evaporate a portion of the liquid. On a commercial scale the evaporation must be rapid to be economically attractive so a reduced pressure and added heat are often used. This evaporation step results in a boiling and foaming of the dispersion. The foam must then be "broken" to eliminate the bubbles of gas from the liquid dispersion to allow the separation of the liquid phase from the gas phase. A number of methods have been used to break liquid-gas foams such as centrifugal separators, sonic devices, foreign material vapor injectors and cold fingers. None of these methods are satisfactory on a commercial process scale for converting to gas-free liquid dispersions the voluminous foams that are formed during the concentration of the polymer dispersions, particularly those which comprise partially neutralized olefin-organic acid copolymers in water-based system. The foam problem is further amplified by the presence of surfactants which are commonly used with polymer dispersions.

Surprisingly, it has been discovered that these foams can be effectively broken and the dispersion concentrated by action of a jet of super-heated steam when the steam and foam are mixed and passed through the small diameter part of a Venturi-type tube and passed into the larger diameter section of the Venturi-type tube. In this process the foam is broken into tiny droplets which causes the liquid and gas phases of the foam bubbles to separate and heat from the super-heated steam removed some of the liquid from the dispersion by evaporation.

Figure 1:
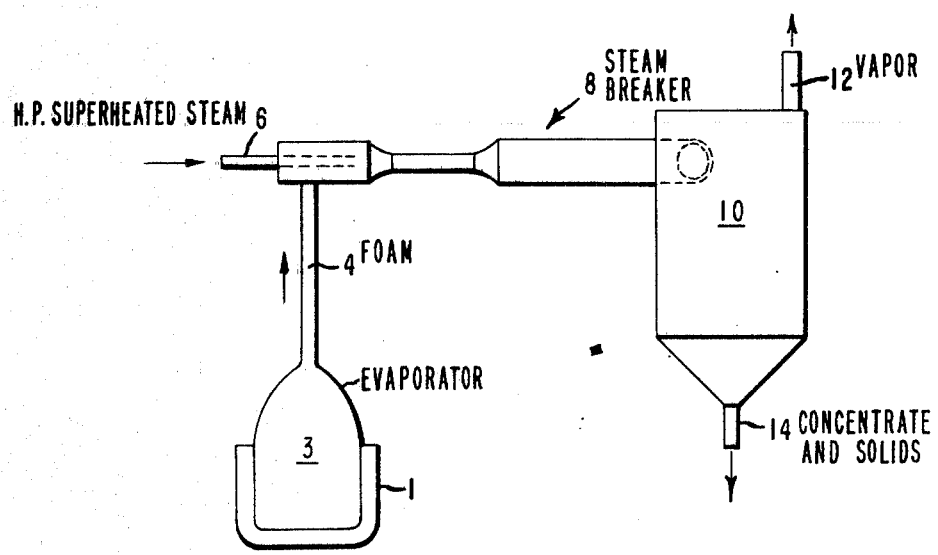
FIG. 1 shows a schematic diagram of the evaporator, steam breaker and liquid-gas phase separator.

FIG. 1 of the drawings shows the steam foam breaker 8 of this invention in a schematic diagram of the combination in which it is usually operated. The dispersion is introduced to the evaporator 3 which is heated by the steam jacket 1. As the dispersion begins to foam, the foam is drawn from the evaporator 3 through the pipe 4 by a pumping or suction means. The foam is introduced into the steam breaker 8 from pipe 4 while high pressure steam is introduced to the steam breaker 8 through steam pipe 6. The foam is then broken and ducted into cyclone separator 10 in which the liquid is drawn through duct 14 and the vapor through duct 12.

Figure 2:
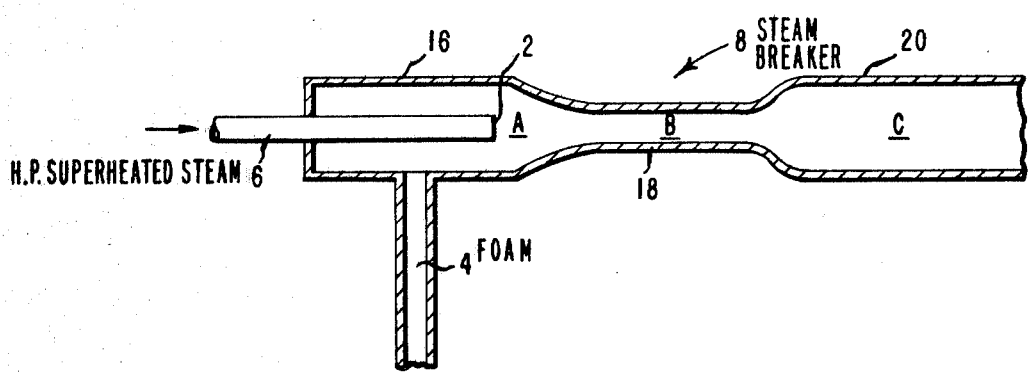
FIG. 2 shows an enlarged longitudinal section of the steam breaker of FIG. 1.

FIG. 2 shows the construction detail of an embodiment of the steam breaker 8. The foam is introduced into chamber 16 through pipe 4 by a pump or by the vacuum created by the Venturi effect of a high pressure steam being introduced into chamber 16 through pipe 6. The jet of super-heated steam from pipe 6 begins to expand on exiting nozzle 2 of pipe 6 and becomes mixed with and entrains a quantity of foam. In the steam breaker 8 the steam exit the nozzle 2 has a velocity of 1000 to 2500 ft./sec. with the preferred velocity being 1500 to 2000 ft./sec. This creates very high steam velocities at point A in the steam breaker 8 for mixing the steam and foam and also creates a vacuum behind the nozzle allowing it to also act as a pump to draw foam into the system. The high velocities exit the nozzle 2 create a very high turbulence and shear at this point, thus tending to break the entering foam and liquid into small droplets. Due to the turbulence at point A mass and heat transfer rates between liquid and steam are high.

The steam, foam and liquid mixture is directed into the small diameter constricted section 18 of the Venturi-type tube (steam breaker 8). In the constricted section 18 the steam, foam and liquid mixture is subjected to a high shear turbulence (turbannular flow). At point B the velocity of the steam, foam and liquid mixture should be greater than 125 ft./sec. and preferably greater than 150 ft./sec. The steam, foam and liquid mixture becomes a liquid in the form of a thin film and spray in the constricted section 18 resulting in extremely high evaporation and stripping rates.

Exit the turbulent section (constricted portion 18 and area B) the liquid sprays into the larger diameter section 20 of a Venturi-type tube (steam breaker 8) where the velocity of the liquid is reduced to less than 100 ft./sec. and preferably less than 75 ft./sec. with a minimum of 25 ft./sec. In the reduced velocity area C the liquid drops and flows along the bottom of the section 20 with low turbulence. The expanded diameter section 20 should have a length that is equal to at least 10 times the diameter of section 20. This length is required to give the liquid spray a sufficiently long residence time in section 20 to allow the liquid to drop to the bottom of section 20. Minimum residence time should range from about .05 sec. at a velocity of 100 ft./sec. in area C to about 0.1 sec. at 25 ft./sec. Any foam that is introduced or generated in the high turbulence regions (areas A and B) is broken by the spraying action and high turbulence. The spray breaks the liquid into such fine droplets that foam bubbles are broken. The low velocities of both liquid and vapor in area C reduce the amount of foam that is regenerated after the velocity let-down before separation in the separator 10. A low pressure drop through section 20 can be utilized to reduce to a minimum any flashing and foaming that may occur due to decreasing pressure at the entrance to the separator 10.

Steam to liquid ratio in the stripper (area B) is usually 0.5 to 25 or greater but preferably in the range of 1 to 5. Several factors control this ratio and the actual steam rate. The minimum and maximum steam input rates are controlled by the geometry of the system and the velocities that must be maintained in areas A, B and C. While maintaining the steam velocities in areas A, B and C within the required ranges the steam rate and steam-to-liquid ratio used depend on the amount of evaporation that must be done and the amount of super-heat in the steam. The solids-bearing liquid-gas foams that may be broken by this process encompasses finely divided solids and include finely divided polymers where the term polymers includes homopolymers, copolymers and blends of the same and in particular, polymers containing polar groups such as ester and acid groups where, for example, the carboxyl groups may be partially neutralized. The solids may be carried in an aqueous or aqueous based dispersion where a surfactant may be present. In particular the process is applicable to aqueous-based polymer dispersions in which foaming occurs during rapid agitation or thermal concentration by evaporation or both. Examples of specific polymers that comprise the solids in the solids-bearing liquid foams to which this process is applicable include ethylene-methacrylic acid copolymers, partially neutralized ethylene-methacrylic acid copolymers, ethylene-vinyl acetate copolymers, ethylene-methacrylic acid-vinyl acetate terpolymers, chlorosulfonated polyethylene and styrene-butadient-acrylic polymers.

EXAMPLE I

A steam breaker comprised of a series of successive cylindrical sections of which the foam intake section was ¾ inch inner diameter (ID) the reduced diameter cylindrical section (stripper) was 3 inches long and of ⅜ inch ID and the large diameter cylindrical section was 12 inches long and of ¾ inch ID. The steam nozzle was of ¹⁄₁₆ inch ID. The foam feed pipe was connected to a dispersion evaporating means and the large diameter cylindrical section was the input pipe to a cyclone type, liquid-gas separator. 110 gm./min. of superheated steam (400° F.) from a 175 p.s.i.g. steam source was fed through the steam intake pipe and emitted from the nozzle approximately 1500 ft./sec. The velocity through the restricted diameter section was approximately 160 ft./sec. and the velocity through the larger diameter section was approximately 40 ft./sec. Approximately 40 gram/min. of foam comprising a liquid which contained 20% by weight dispersed ionomer resin which is a copolymer of ethylene and 11 wt. percent of methacrylic acid which has been 15% neutralized with NaOH as described in U.S. Pat. No. 3,264,272 to E. I. du Pont de Memours & Co., 35% water, 33% benzene and 12% isopropyl alcohol plus 5% sodium oleate (based on polymer weight) as a surfactant was input to the low pressure foam intake section of the steam breaker and forced through the steam breaker by action of the steam jet to the separator. Defoamed liquid issued from the liquid outlet of the cyclone separator at a rate of about 35 grams/min. which consisted essentially of an aqueous dispersion of 33% by weight ionomer resin with the dispersing agent with only traces of the benzene and isopropyl alcohol remaining. The vaporized water, benzene and isopropyl alcohol flowed from the separators gas outlet.

EXAMPLE II

A steam breaker comprised of a series of successive cylindrical sections of which the foam intake section was .2 feet long and of 6 inches inner diameter, the reduced diameter cylindrical section (stripper) was 13 inches long and of 3 inches inner diameter and the large diameter cylindrical section was 20 feet long and of 6 inches inner diameter. The foam feed pipe was of 6 inches inner diameter and the steam input pipe was of .75 inch inner diameter. The foam feed pipe was connected to a dispersion evaporator kettle and the large diameter cylindrical section was the input pipe to a cyclone type, liquid-gas separator. 2000 pounds per hour (p.p.h.) of superheated steam (500° F.) from of 550 p.s.i.g. steam source was fed through the steam intake pipe and emitted from the nozzle at approximately 1700 ft./sec. The velocity through the restricted diameter section was approximately 300 ft./sec. and the velocity through the larger diameter section was approximately 75 ft./sec. Approximately 1100 p.p.h. of foam comprising a liquid which contained 20% by weight dispersed ionomer resin as in Example I, 35% water, 33% benzene and 12% isopropyl alcohol plus 5% sodium oleate (based on polymer weight) as a surfactant was input to the low pressure foam intake section of the steam breaker and forced through the steam breaker by action of the steam jet to the separator. Defoamed liquid issued from the liquid outlet of the cyclone separator at a rate of 700 p.p.h. and consisted essentially of an aqueous dispersion of 33% by weight ionomer resin with the dispersing agent with only traces of the benzene and isopropyl alcohol remaining. The vaporized water, benzene and isopropyl alcohol flowed from the separators gas outlet.

EXAMPLE III

The liquid recovery from Example II was further concentrated to the 50% by weight of ionomer resin level by reintroduction of the liquid directly to the steam breaker operated under similar conditions to those of Example II. Essentially no benzene or isopropyl alcohol remained in the aqueous dispersion recovered.

As many apparently widely different embodiments of this invention may be made without departing from the spirit and scope thereof, it is to be understood that this invention is not limited to the specific embodiments there except as defined in the appended claims.

What is claimed is:
1. A process for recovering a solids-bearing liquid phase from a solids-containing liquid-gas foam and concentrating the liquid phase by removal of liquid comprising the steps of:
 (a) axially directing a jet of super-heated steam into a conduit leading into the converging portion of a Venturi-type tube;
 (b) inducting a solids-containing liquid-gas foam into the said conduit which surrounds the steam jet to form a turbulent moving liquid-gas foam and steam mixture flowing axially onto the converging portion of said Venturi-type tube;
 (c) reducing the velocity of the moving mixture formed in step (b) to separate the moving mixture into a gas phase and a concentrated solids-containing liquid phase; and
 (d) recovering the concentrated solids-containing liquid phase.

2. The process of claim 1 in which the velocity of the steam of step (a) is from about 1000 to about 2500 ft./sec., the velocity of the mixture of step (b) is greater than about 125 ft./sec., and the velocity of the mixture of step (c) is reduced to below about 100 ft./sec. but above about 25 ft./sec.

3. The process of claim 1 in which the velocity of the steam of step (a) is from about 1500 to about 2000 ft./sec., the velocity of the mixture of step (b) is greater than about 150 ft./sec., and the velocity of step (c) is reduced to below about 75 ft./sec. but above about 25 ft./sec.

4. The process of claim 1 in which the solids-containing liquid-gas foam is an aqueous-based polymer dispersion in a liquid-gas foam condition.

5. The process of claim 4 in which the solids in the solid-containing liquid gas foam is a polymer containing polar groups.

6. The process of claim 5 in which the polar groups of the polymer are partially neutralized.

References Cited

UNITED STATES PATENTS

| | | | |
|---|---|---|---|
| 1,449,114 | 3/1923 | Hayduck | 55—178 |
| 2,042,488 | 6/1936 | Theiler | 159—47 |
| 2,384,998 | 9/1945 | Haugh | 159—48 |
| 2,887,390 | 5/1959 | Coulter et al. | |
| 3,039,107 | 6/1962 | Bradford | 159—48 |
| 3,275,062 | 9/1966 | Williams. | |
| 3,341,429 | 9/1967 | Fondrk | 203—95 |

FOREIGN PATENTS

| | | |
|---|---|---|
| 34,360 | 3/1925 | Denmark. |
| 1,019,482 | 2/1966 | Great Britain. |

NORMAN YUDKOFF, Primary Examiner

J. SOFER, Assistant Examiner

U.S. Cl. X.R.

252—321, 349, 361